(12) United States Patent
Hirano et al.

(10) Patent No.: US 9,900,646 B2
(45) Date of Patent: Feb. 20, 2018

(54) METHOD, DEVICE AND COMPUTER PROGRAM PRODUCT FOR OUTPUTTING A TRANSPORT STREAM

(71) Applicants: Sony Corporation, Tokyo (JP); Sony Europe Limited, Weybridge (GB)

(72) Inventors: Kazumi Hirano, Tokyo (JP); Toru Domukai, Tokyo (JP); Samuel Aran Masham, Tokyo (JP)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 0 days.

(21) Appl. No.: 15/259,956

(22) Filed: Sep. 8, 2016

(65) Prior Publication Data

US 2017/0055018 A1    Feb. 23, 2017

Related U.S. Application Data

(60) Continuation of application No. 14/560,730, filed on Dec. 4, 2014, now Pat. No. 9,445,156, which is a
(Continued)

(30) Foreign Application Priority Data

Mar. 30, 2012 (GB) .................................. 1205761.8
Dec. 17, 2012 (GB) .................................. 1222726.0

(51) Int. Cl.
*H04N 21/472* (2011.01)
*H04N 21/422* (2011.01)
(Continued)

(52) U.S. Cl.
CPC ... *H04N 21/42224* (2013.01); *H04N 21/2187* (2013.01); *H04N 21/2387* (2013.01);
(Continued)

(58) Field of Classification Search
CPC ................................................ H04N 21/47217
See application file for complete search history.

(56) References Cited

U.S. PATENT DOCUMENTS

| 6,219,839 | B1 | 4/2001 | Sampsell |
| 7,716,707 | B2 | 5/2010 | De Heer |

(Continued)

FOREIGN PATENT DOCUMENTS

| CN | 1692644 A | 11/2005 |
| CN | 101176087 A | 5/2008 |

(Continued)

OTHER PUBLICATIONS

United Kingdom Search Report dated Aug. 20, 2012 in corresponding Great Britain Application No. 1205761.8 filed Mar. 30, 2012.
(Continued)

*Primary Examiner* — Hunter B Lonsberry
(74) *Attorney, Agent, or Firm* — Oblon, McClelland, Maier & Neustadt, L.L.P.

(57) ABSTRACT

A method comprising: receiving, via a distribution channel, video data having an identifier that identifies a position within a video and an address defining a location of a stored playlist. The method also comprises obtaining from a server a playlist in response to a user input, where the playlist includes location information identifying a location of a stored transport stream. The method also comprises receiving the transport stream from the location identified in the playlist over a network, and displaying the obtained transport stream.

18 Claims, 11 Drawing Sheets

Related U.S. Application Data division of application No. 13/754,295, filed on Jan. 30, 2013, now Pat. No. 8,931,019.

(51) Int. Cl.
| | |
|---|---|
| *H04N 21/2387* | (2011.01) |
| *H04N 21/43* | (2011.01) |
| *H04N 21/435* | (2011.01) |
| *H04N 21/458* | (2011.01) |
| *H04N 21/858* | (2011.01) |
| *H04N 21/2187* | (2011.01) |
| *H04N 21/262* | (2011.01) |
| *H04N 21/2668* | (2011.01) |
| *H04N 21/414* | (2011.01) |
| *H04N 21/482* | (2011.01) |
| *H04N 21/643* | (2011.01) |

(52) U.S. Cl.
CPC ... *H04N 21/2668* (2013.01); *H04N 21/26258* (2013.01); *H04N 21/41407* (2013.01); *H04N 21/435* (2013.01); *H04N 21/4307* (2013.01); *H04N 21/458* (2013.01); *H04N 21/47217* (2013.01); *H04N 21/4825* (2013.01); *H04N 21/64322* (2013.01); *H04N 21/8586* (2013.01)

(56) References Cited

U.S. PATENT DOCUMENTS

| | | | |
|---|---|---|---|
| 8,732,780 | B2 | 5/2014 | Kahn |
| 2008/0120659 | A1* | 5/2008 | Gastinger ............... H04N 5/76 725/93 |
| 2009/0136204 | A1 | 5/2009 | Chen et al. |
| 2011/0126233 | A1 | 5/2011 | Scott et al. |
| 2011/0138424 | A1* | 6/2011 | Vlot .................... H04N 5/4401 725/48 |
| 2011/0246885 | A1* | 10/2011 | Pantos ............... H04L 65/4084 715/716 |

FOREIGN PATENT DOCUMENTS

| | | |
|---|---|---|
| CN | 101378393 A | 3/2009 |
| CN | 102217317 A | 10/2011 |
| CN | 102236502 A | 11/2011 |
| EP | 1 723 539 | 11/2006 |

OTHER PUBLICATIONS

United Kingdom Patents Act 1977: Search Report under Section 17(5) dated Jun. 10, 2013, in United Kingdom Patent Application No. GB1222726.0.

Combined Office Action and Search Report dated Dec. 7, 2017 in Chinese Patent Application No. 2013101081919 (submitting English language translation only).

* cited by examiner

| ONID/TSID/SID | Playlist URL |
|---|---|
| 0x323A/0x1004/0x10FF | http://CDN.co.uk/playlist/323A/1004/10FF.m3u8 |
| 0x323A/0x1004/0x1084 | http://CDN.co.uk/playlist/323A/1004/1084.m3u8 |
| .... | |

FIG. 4

```
# EXTM3U
# EXT-X-TARGETDURATION:8
# EXT-X-MEDIA-SEQUENCE:2680
# EXTINF:8,
https://CDN.co.uk/content/323A/1004/10FF-2680.ts
# EXTINF:8,
https://CDN.co.uk/content/323A/1004/10FF-2681.ts
# EXTINF:8,
https://CDN.co.uk/content/323A/1004/10FF-2682.ts
       ⋮
https://CDN.co.uk/playlist/323A/1004/10FF.m3u8
```
⎬ 122B

FIG. 5

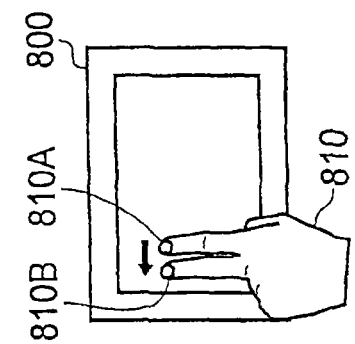
FIG. 9A
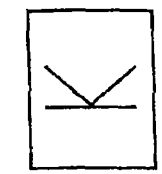
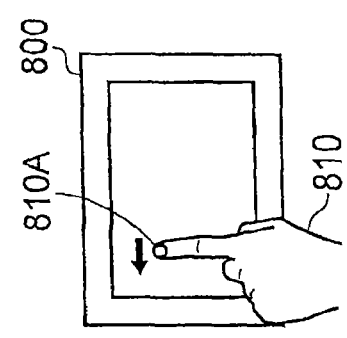
FIG. 9B
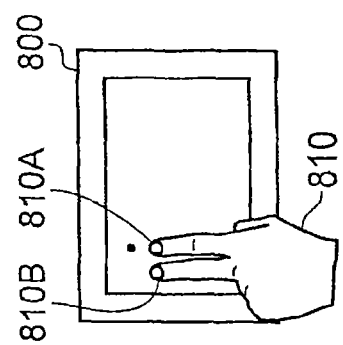
FIG. 9C
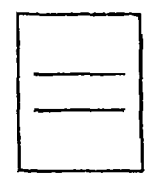
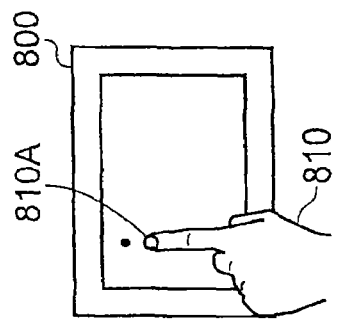
FIG. 9D
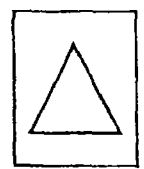

METHOD, DEVICE AND COMPUTER PROGRAM PRODUCT FOR OUTPUTTING A TRANSPORT STREAM

CROSS-REFERENCE TO RELATED APPLICATIONS

This application continuation of U.S. application Ser. No. 14/560,730, filed Dec. 4, 2014, which is a division of U.S. application Ser. No. 13/754,295, filed Jan. 30, 2013, and is based upon and claims the benefit of priority from United Kingdom Patent Applications No. 1205761.8, filed Mar. 30, 2012 and No. 1222726.0, filed Dec. 17, 2012, the entire content of each of the foregoing applications is incorporated herein by reference.

BACKGROUND OF THE DISCLOSURE

Field of the Disclosure

The present disclosure relates to a method, device and computer program product for outputting a transport stream.

Description of the Related Art

At present consumers have the opportunity to view televisual content over the Internet using a so-called "video on demand" system. This type of system enables a user to select video content to view over the Internet. This video content may include televisual broadcasts previously broadcast. One example of this is iPlayer provided by the British Broadcasting Corporation (BBC).

However, in order to access this content, the televisual broadcast must be completed and uploaded to the server by the video on demand service. This provides an inconvenience for the viewer.

Embodiments of this disclosure may address this issue.

SUMMARY

Embodiments of the disclosure provide a software application linking broadcast content to corresponding content available on a server. The corresponding content may be segmented into portions. The corresponding content may be substantially time aligned to the broadcast content, allowing for latency in the assembly of the content and/or delivery systems.

According to one aspect of the present disclosure, there is provided a method comprising: receiving, via a broadcast channel, video data having an identifier that identifies a position within the video and an address defining the location of a stored playlist; obtaining from a server the playlist in response to a user input, the playlist containing location information identifying the location of a stored transport stream; receiving the transport stream from the location identified in the playlist over a network; and displaying the obtained transport stream.

Embodiments of the disclosure may allow the user to interact with broadcast content to provide additional functionality to the content.

The stored transport stream may include at least one frame of said video data corresponding to that received over the broadcast channel. Embodiments of the disclosure may allow the user to effectively perform operations on the content such as pause, rewind, fast forward etc.

The method may further comprise storing the video data obtained over the broadcast channel concurrently with displaying the transport stream obtained from the server; performing a transition back to the received video data by increasing the speed of playback of the transport stream; stopping display of the transport stream; and displaying the stored video data with an increased playback speed. Embodiments of the disclosure may enable smooth transition upon returning to the broadcast content.

The method may further comprise storing the video data obtained over the broadcast channel; stopping display of the transport stream and displaying the stored video data. This may reduce the discontinuity between switching from server based content to broadcast content.

The transport stream may include a plurality of transport stream clips, each transport stream clip being of a predetermined clip duration; provide the location of each of the transport stream clips and the duration of each of the transport stream clips in the playlist, and the method may include selecting the transport stream clip to be retrieved in accordance with the duration of each of the transport stream clips provided in the playlist and the identifier of the position within the video; and retrieving the selected transport stream clip.

The identifier may be a video timestamp.

According to another aspect, there is provided a computer program containing computer readable instructions which when loaded onto a computer configures the computer to perform a method according to any embodiment.

A storage medium which is configured to store the computer program of the aspect therein or thereon is provided.

According to another aspect, there is provided a device comprising: a receiver configured in use to receive, via a broadcast channel, video data having an identifier that identifies a position within the video and an address defining the location of a stored playlist; a network connector configured in use to obtain from a server the playlist in response to a user input, the playlist containing location information identifying the location of a stored transport stream; wherein the network connector is further configured in use to receive the transport stream from the location identified in the playlist over a network; and an output configured in use to output the obtained transport stream for display.

The stored transport stream may include at least one frame of said video data corresponding to that received over the broadcast channel.

The device may further comprise a memory configured in use to store the video data obtained over the broadcast channel concurrently with displaying the transport stream obtained from the server; and a controller configured in use to perform a transition back to the received video data by increasing the speed of playback of the transport stream; stop display of the transport stream; and to output the stored video data for display with an increased playback speed.

The device may further comprise a memory configured in use to store the video data obtained over the broadcast channel; and a controller configured in use to stop display of the transport stream and to output the stored video data for display.

The transport stream may include a plurality of transport stream clips, each transport stream clip being of a predetermined clip duration and the playlist provides the location of each of the transport stream clips and the duration of each of the transport stream clips in the playlist; the device may further comprise a controller configured in use to select the transport stream clip to be retrieved in accordance with the duration of each of the transport stream clips provided in the playlist and the identifier of the position within the video; and the network connector is configured in use to retrieve the selected transport stream clip.

The identifier may be a video timestamp.

There is also provided a television comprising a display and a device according to any one of the embodiments.

BRIEF DESCRIPTION OF THE DRAWINGS

The above objects, features and advantages of the disclosure will be apparent from the following detailed description of illustrative embodiments which need to be read in connection with the accompanying drawings, in which:

FIG. 4 shows the structure of a look-up table stored in the server according to embodiments of the present disclosure;

FIG. 5 shows the structure of a playlist according to embodiments of the present disclosure;

FIGS. 9A to 9F show different gestures to control the tablet.

DESCRIPTION OF EMBODIMENTS

Figure 1:
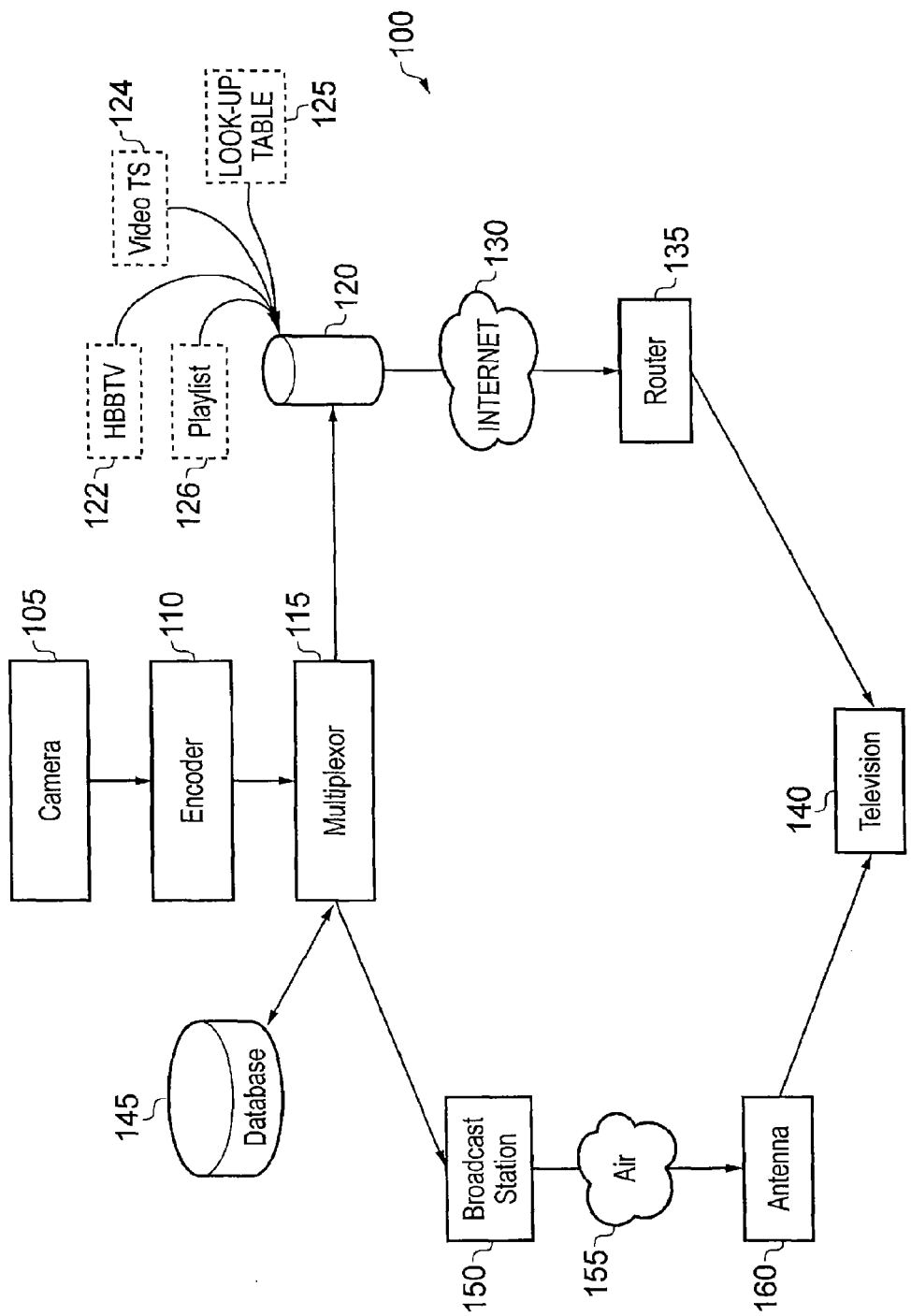
FIG. 1 shows a system according to embodiments of the present disclosure.

Referring to FIG. 1, a system 100 according to an embodiment of the present disclosure is shown. In this system 100, a camera 105 captures video and/or audio content. The output of the camera 105 is typically edited in an editing suite (not shown). The captured (and possibly edited) content in encoded in an encoder 110.

In embodiments, the content is encoded using, for example, the Moving Pictures Expert Group (MPEG) 2 format. However, the disclosure is not limited to such a format and any other video and/or audio format is envisaged.

The encoded content is fed into a multiplexor 115. The multiplexor 115 multiplexes the received encoded video and/or audio data with other data. In embodiments, the other data includes an identifier that uniquely identifies the broadcast program and a Hybrid Broadcast Broadband TV (HBBTV) URL. As the HBBTV programming language is known to the skilled person, a detailed discussion of the HBBTV programming language will not be provided. However, the HBBTV URL is an .html link which identifies the location of a HBBTV application. However, the skilled person will appreciate that the HBBTV URL may be an index.php, main.cgi, application.asp or the like. The identifier is, in embodiments, a video timestamp, although any type of identifier that identifies the video is also envisaged. The identifier may uniquely identify the frame of video for a very accurate playback or may indicate the approximate location of a particular frame of video. For example, the location of a particular frame may be approximately determined using the nearest video timestamp.

The other data, in embodiments, is inserted in the private field of the MPEG 2 transport stream adaptation field. In order to indicate that the private field of the MPEG 2 transport stream adaptation field has data contained therein, the transport private data flag is set to 1 as would be appreciated by the skilled person.

In addition, the other data may include metadata such as the Event Information Table (EIT) that provides Electronic Program Guide (EPG) information. Additionally, closed caption information may also be included with the metadata. The EIT and closed caption information is known to the skilled person and are defined by the various Digital Video Broadcast (DVB) standards. Of course, corresponding tables are also available in other transmission standards which are equally applicable to embodiments of the present disclosure. Examples of these standards include ATSC and ARIB.

Of course, in embodiments, although the other data and the metadata is inserted into the private field of the MPEG 2 transport stream adaptation field, the other data and metadata may be inserted in any appropriate part of the transport stream.

The multiplexor 115 is connected to a database 145. In the database 145 is stored the video timestamps which are used to identify the video in the transport stream and a triplet of information including the original network identifier (ONID), transport stream identifier (TSID) and the service identifier (SID) associated with the timestamp. The video timestamps are retrieved by the multiplexor 115.

The multiplexed MPEG2 transport stream is fed to a broadcast station 150. The broadcast station 150 is a terrestrial broadcast station. However, as would be appreciated, the broadcast station 150 may be a satellite broadcast station, cable television broadcast station or indeed any broadcast station such as a broadcast station broadcasting to handheld devices complying with, for example, the Digital Video Broadcast—Handheld (DVB-H) format. Other broadcast modes and/or standards may equally be used.

Figure 2:
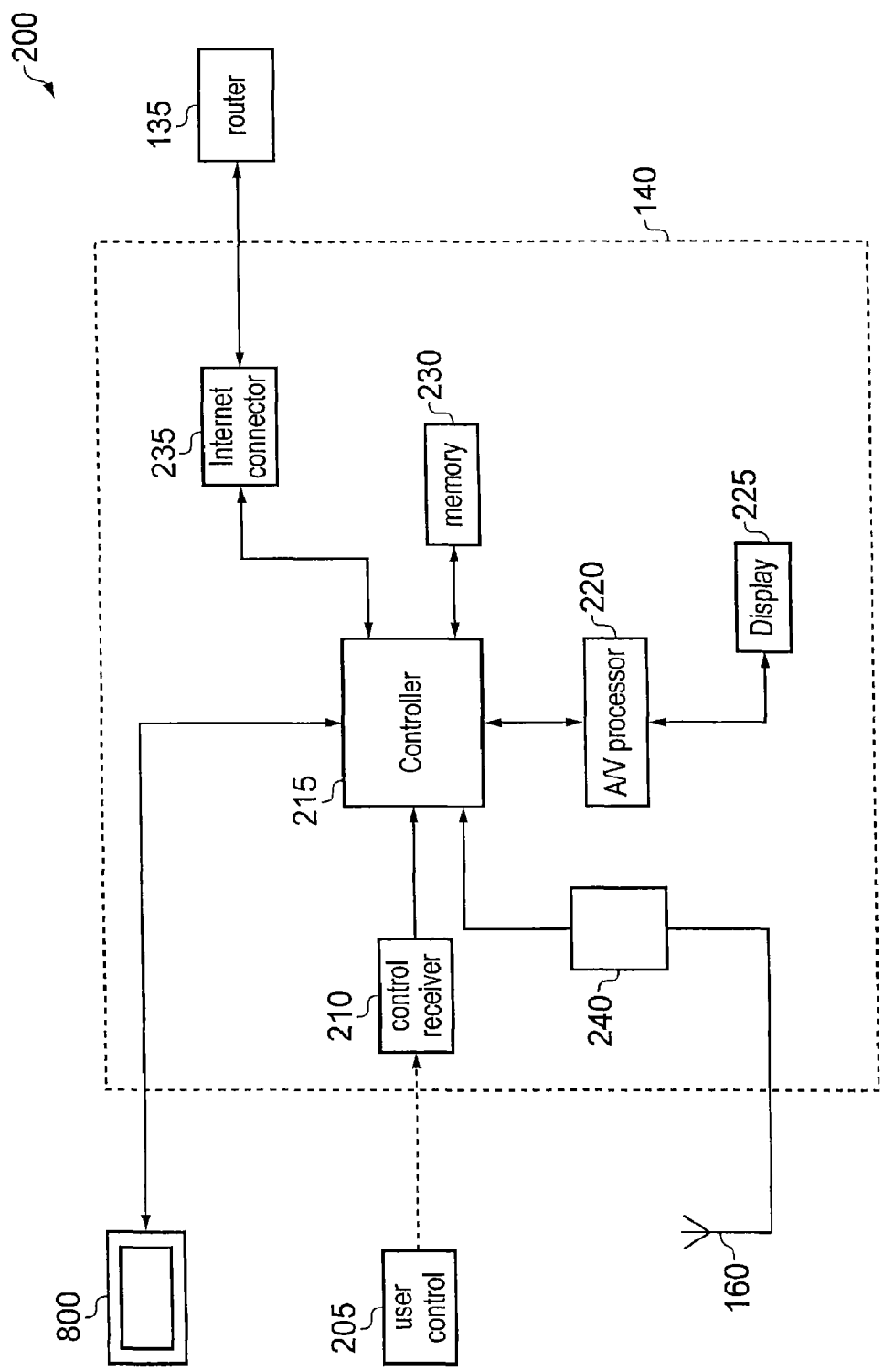
FIG. 2 shows a television according to embodiments of the present disclosure.

The broadcast station 150 broadcasts the multiplexed MPEG2 transport stream over the air 155. The broadcast signal is received by an antenna 160 within the user's home. The received multiplexed transport stream is fed to television 140. Television 140 will be described in more detail with reference to FIG. 2.

Additionally, the multiplexor 115 multiplexes the encoded MPEG2 content to generate a number of MPEG2 transport stream files. In other words, the multiplexor 115 splits the encoded MPEG2 transport streams into a plurality of segments and for each segment, the multiplexor 115 generates a transport stream file. These transport stream files will be used to enable a viewer to download video such that the user may "rewind" or perform other function on the broadcast content. Although this will be explained later, it should be noted that the generation of MPEG2 transport stream files is to comply with the particular protocol used (HTTP Live Streaming) used to deliver the content to the television. If a different protocol is used, such as MPEG2 Dynamic Adaptive Streaming, then the generation of the transport stream files may be un-necessary or may be different.

In embodiments, the multiplexor 115 segments the transport stream into a plurality of transport stream files; each file containing 8 seconds of encoded video. Additionally created by the multiplexor 115 is a playlist file. The playlist file will be explained in more detail with reference to FIG. 5. However, in brief, the playlist file contains a pointer to each of the created transport stream files and complies with the HTTP Live Streaming format. The pointer stored within the playlist file may be a URL or a URI (Unique Resource Identifier).

The multiplexor 115 stores the created transport stream files and the playlist file in a server 120. The server 120 is accessible over the Internet or any kind of network 130.

Such a network may or may not have quality of service guarantees. In FIG. 1, it is immediately apparent that the server 120 stores the playlist 126 (see FIG. 5), a HBBTV look-up table 122 (see FIG. 4) and the video transport stream files 124. As will be explained later, a router 135 which is also connected to the television 140 accesses the information stored within the server 120 via the Internet 130.

The television 140 is controlled by a user operating a user control 205. The user control 205 may be a remote commander or the like. However, the user control 205 may be an application running on a portable computing device such as a Tablet S produced by Sony®. Voice activated or gesture based commands may provide an alternative and in some embodiments may obviate the need for a physical user control 205. The user control 205 communicates with a control receiver 210 that decodes the control signals received from the user control 205. The control receiver 210 is connected to the controller 215 which controls the operation of the television 140. Also connected to the controller 215 is a decoder 240. The decoder 240 is connected to the antenna 160 and decodes the broadcast signal received from the broadcast station 150. The decoded signal is fed to the controller 215. In embodiments, the decoder includes a tuner and demodulator.

In order to display the video, the controller 215 provides video and/or audio data received from the decoder 240 to an audio and/or video (A/V) processor 220. The A/V processor 220 generates audio signals to be played over speakers (not shown) and video signals to be reproduced on display 225. The display 225 may be a liquid crystal display type display such as a Sony® Bravia® television.

Also connected to the controller 215 is memory 230. The memory 230 may be built in to the television or may be provided externally. The memory 230 is, in embodiments, solid state memory, but the disclosure is not limited and may be any kind of memory such as optically readable or the like.

The memory 230 stores computer readable instructions which are in the form of a computer program. The computer program stored within the memory 230 controls the controller 215 to perform a method according to embodiments of the present disclosure. Additionally, and as will be explained later, the memory 230 acts as a buffer to store transport streams that the television 140 retrieves from the server 120.

The controller 215 is also connected to an internet connector 235. In embodiments, the internet connector 235 is an Ethernet connector. The internet connector 235 is connected to the router 135. Of course, embodiments of the present disclosure may be applied to any kind of network connection. For example, the internet connector 235 may be wired, wireless, Powerline or HomePlug® or a 3G/4G network.

Additionally a tablet 800 communicates with the television 140. The tablet 800 may be any kind of tablet computer such as a Sony® Tablet S or a Sony® Xperia® Tablet S which may or may not also operate as the user control 205. The tablet 800 may communicate using Bluetooth or any kind of wired or wireless connection. The operation of the tablet 800 will be described in more detail with reference to FIGS. 7B and 8.

Figure 3:
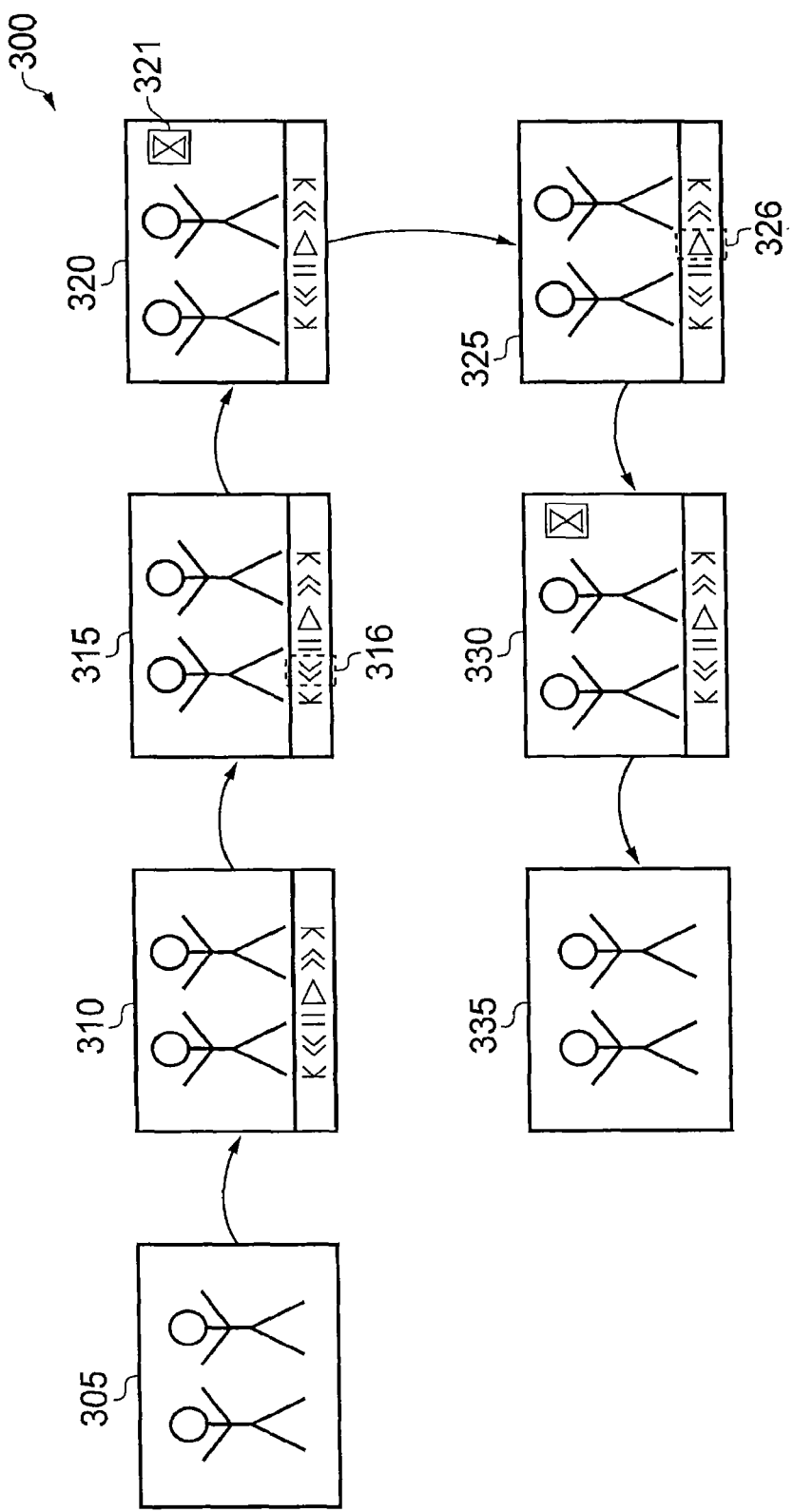
FIG. 3 shows representative screenshots of embodiments of the present disclosure.

FIG. 3 shows a sequence of screen shots illustrating the operation of embodiments of the present disclosure. A television signal is received at the antenna 160. The television 140 receives this signal and displays the associated video frame or sequence of video frames. A first image 305 in an image sequence 300 is displayed to the user. The first image 305 shows a frame of live content. In other words, the first frame 305 is a frame of video currently being broadcast by the broadcast station 150.

At this time, the viewer of the television 140 decides that he or she wants to rewind the currently broadcast video. In order to interact with the currently broadcast content, the user presses a button on the user control 205. This button may be the so-called "red button". The live video stream continues and a Graphical User Interface (GUI) is shown on the display. This is shown in the second frame 310. The GUI is generated using a HBBTV application stored within the server 120. In order to obtain the HBBTV application, the television 140 retrieves the HBBTV URL which is located in the transport stream broadcast by the broadcast station 150. The HBBTV URL provides the location of the HBBTV application which is downloaded by the television 140 over the network 130. In other words, when the television 140 decodes the incoming transport stream broadcast by the broadcast station, the HBBTV URL directs the television 140 to the location of the HBBTV application stored on the server 120. The television 140 then downloads the HBBTV application from the server 120 and stores this locally in the storage memory 230.

The downloaded HBBTV application provides the code to display the GUI on the screen. It is envisaged that the HBBTV application may be updated by the broadcast station 150 that allows the GUI to be customised, such as advertising sponsors logos being included in the GUI.

Once the HBBTV application has loaded, the user may control the video controls in the GUI using the user control 205. In the example embodiment, the user wishes to rewind the broadcast content. This is indicated by the dashed lines 316 surrounding the rewind symbol in the GUI in the third frame 315.

As will be explained later, the URL stored in the look-up table 125 is used to access a playlist. This URL is called the "Playlist URL" hereinafter. The playlist is then used to control the content displayed on the television 140. In order for the playlist and the appropriate content to be downloaded into the memory 230 of the television 140, the screen will be frozen for a period of time. This is because the broadcast content is segmented into 8 second segments and then stored on server 120. Therefore, if the broadcast content is live content, the user may have to wait up to 8 seconds until the segment of live video is completed and a further small time, t to allow the segment to be saved, the playlist to be updated and the segment to be downloaded by the television. Accordingly, given the length of time to wait, an egg-timer 321 is displayed in the corner of the frozen screen as shown in the fourth frame 320 to indicate to the user that the application is being downloaded. Although an egg timer is shown, any other kind of message may be displayed. This may include a message asking the viewer to please wait or even an advertisement. If an advertisement is provided the broadcaster may transmit the advertisement at the start of the broadcast and the advertisement may be stored in memory 230 of the television 140. The advertisement may be provided via the network at that time or in advance. The broadcaster may therefore generate income by selling the advertisement opportunity to a sponsor.

In the event that the broadcast content is pre-recorded, the delay described above with respect to the live content does not occur. This is because the video timestamps, playlist and video transport stream files have already been created and stored on the server 120. However, when the recorded content is broadcast, the playlist will be modified in order to correspond to the current broadcast content. In other words, the initial playlist for the recorded content (i.e. the playlist when the content was created) will have changed when the recorded content is broadcast. The playlist stored on the server 120 will need to be updated accordingly.

After the user selects the rewind symbol using the user control 205, the television 140 retrieves the appropriate transport stream from the server 120 as will be explained later. After the appropriate data is downloaded to the television 140 from the server 120, the egg-timer will stop being shown and instead the television 140 will display the transport stream obtained from the server 120. The transport stream obtained from the server 120 will be the transport stream nearest in time to the transport stream of the frame currently being broadcast. During the operation of the GUI, the video displayed to the user is the transport stream provided by the server rather than the video broadcast by the broadcast station 150.

In order to indicate to the user that the video being displayed is that provided by the server 120 rather than the broadcast station 150, a message may be displayed to the user. This message may include textual or graphical information indicating that the video is provided by the server 120 rather than by the broadcast station 150. For example, if the indication to the user is graphical, a time or clock showing the elapsed time between the content provided by the server 120 and the content provided by the broadcast station 150 may be displayed. This elapsed time may be derived from the video timestamps or some other mechanism. The user may be able to toggle whether to show this information or not.

When the user wishes to start playback of the video obtained from the server 120, the user highlights the playback button 326 shown in the fifth frame 325. The user then selects the playback button 326 and the video content is played back. It is important to note that the content during this period is the content downloaded from the server 120 rather than the content being broadcast by the broadcast station 150.

When the user wishes to return to the live content (i.e. the content being broadcast by the broadcast station 150), the user can press the red button again. However, it is useful for a more seamless experience for the user to press a stop button on the GUI (not shown). As the HBBTV application must revert to displaying content broadcast by the broadcast station 150, the egg timer is shown again in the sixth screen 330. The content displayed on the television 140 then returns to the live content being broadcast by the broadcast station 150 in the seventh screen 335.

As noted in FIG. 3, after the user starts the HBBTV application and selects to rewind the broadcast content, a short delay occurs (see the fourth screen shot 320). During this delay, the HBBTV application retrieves the video timestamp and a DVB triplet from the transport stream. The HBBTV application also retrieves the playlist URL indicating the location of the playlist from the server 120. The HBBTV application in the television 140 accesses the server 120 over the Internet 130. The HBBTV application accesses the HBBTV lookup table 122 within the server 122. The HBBTV lookup table 122 is shown in FIG. 4.

Referring to FIG. 4, the DVB triplet which identifies a particular broadcast program is stored in the HBBTV lookup table. Specifically, the DVB triplet is stored in a triplet column 125A of the look-up table. Additionally stored in a playlist URL column 125B is the playlist URL. The playlist URL is stored in correspondence with the DVB triplet. The playlist URL provides, in embodiments, an .html link to the location of the playlist for the program that is associated with the DVB triplet (although other forms of pointer are envisaged). In embodiments, the playlist is stored within the server 120.

Additionally, the playlist stored at the location associated with the playlist URL is retrieved.

FIG. 5 shows a playlist according to embodiments of the present disclosure. The playlist (.m3u8), in embodiments complies with the HTTP Live Streaming protocol, although the disclosure is not so limited and any appropriate protocol is envisaged. Although this would be appreciated by the skilled person, the "EXT-X-TARGETDURATION" value is set to 8. This means that, in this case, each transport stream is 8 seconds long. However, the value of "EXT-X-TARGETDURATION" can be varied to any value. The value of this determines the length of the transport stream file. For example, if the value of "EXT-X-TARGETDURATION" is 2, the transport stream file is 2 seconds long. This value can be any suitable value such as 2 seconds or 10 seconds or the like.

Further, a transport stream file URL is provided in the playlist to each of the transport streams. Therefore, by following the transport stream file URL the appropriate 8 second video segment may be downloaded.

It will be appreciated that the content being broadcast by the broadcast station 150 will be stored in 8 second segments within the server 120. Each 8 second segment will have a transport stream file unique URL. After the creation and storage of the 8 second segment, the transport stream file URL will be stored within the playlist. This means that the playlist is dynamically updated during the broadcast of the program.

Figure 6:
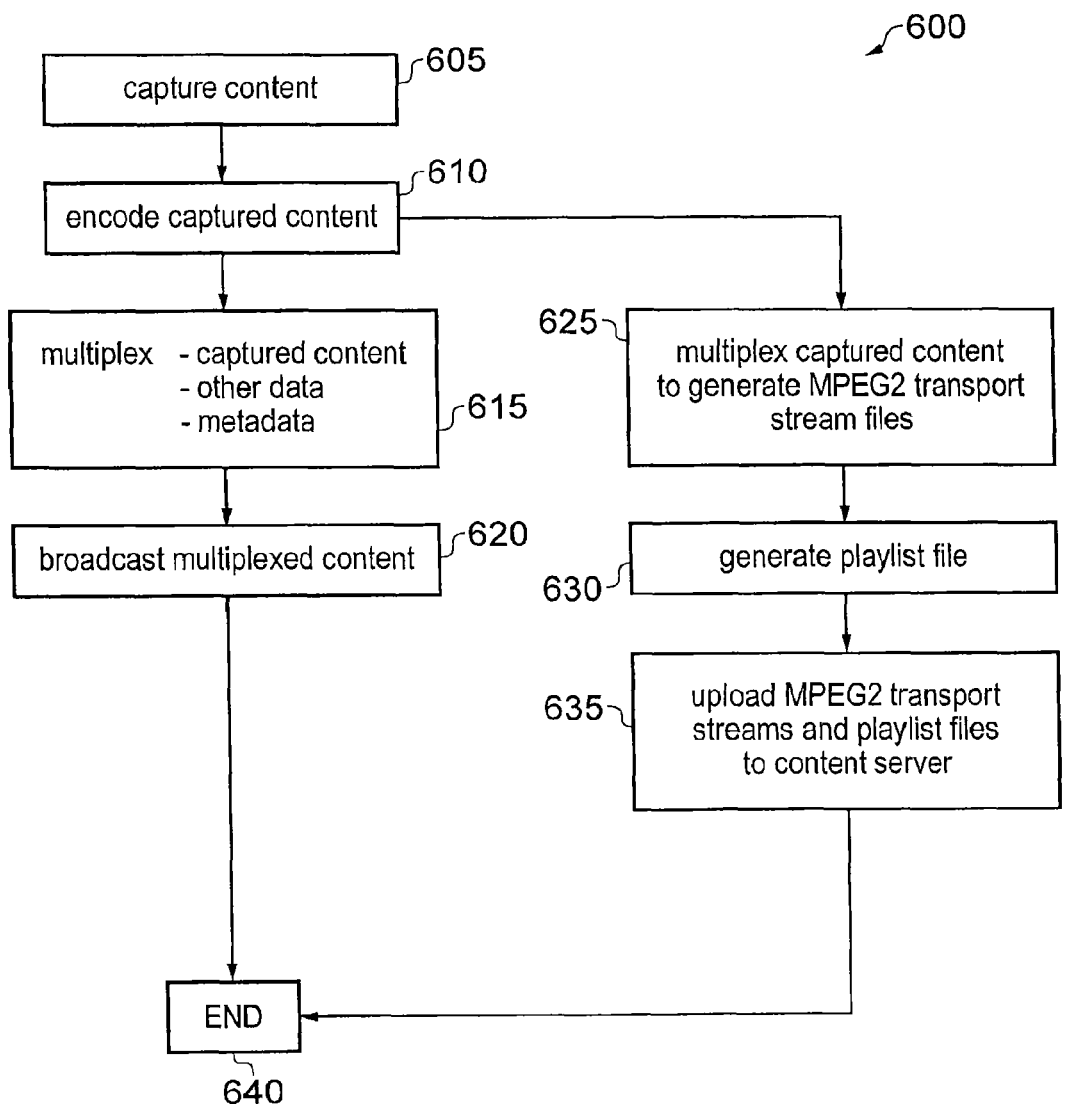
FIG. 6 shows a flow diagram explaining the encoding of the televisual content according to embodiments.

The encoding of the content according to embodiments will be described with reference to the flow chart 600 of FIG. 6. Firstly, the content is captured 605. The captured content is encoded to produce an MPEG2 transport stream in step 610. The encoded data is then fed to the multiplexor 115 which produces a transport stream for broadcast and a separate transport stream for storage on the server 120.

The transport stream for broadcast is produced in step 615. Specifically, the multiplexor 115 multiplexes the encoded captured content with the other data (the HBBTV URL and the video timestamp). Additionally, the multiplexor 115 may include metadata such as the EIT and the like in the transport stream. The multiplexed encoded data is then broadcast using the broadcast station 150.

The multiplexor 115 also produces data for storage on the server 120. Specifically, the multiplexor 115 generates the HBBTV look-up table 125 which stores the DVB triplet in association with the playlist URL. Also, the multiplexor 115 generates the 8 second transport stream clips and stores these on the server 120. The associated playlist is also updated to include a link (the transport stream URL) to the newly created 8 second clip of the transport stream by the multiplexor 115. The updated playlist file and the 8 second clips are uploaded back onto the server 120. This is shown in steps 625, 630 and 635 of FIG. 6.

The encoding steps end at step 640.

Figure 7A:
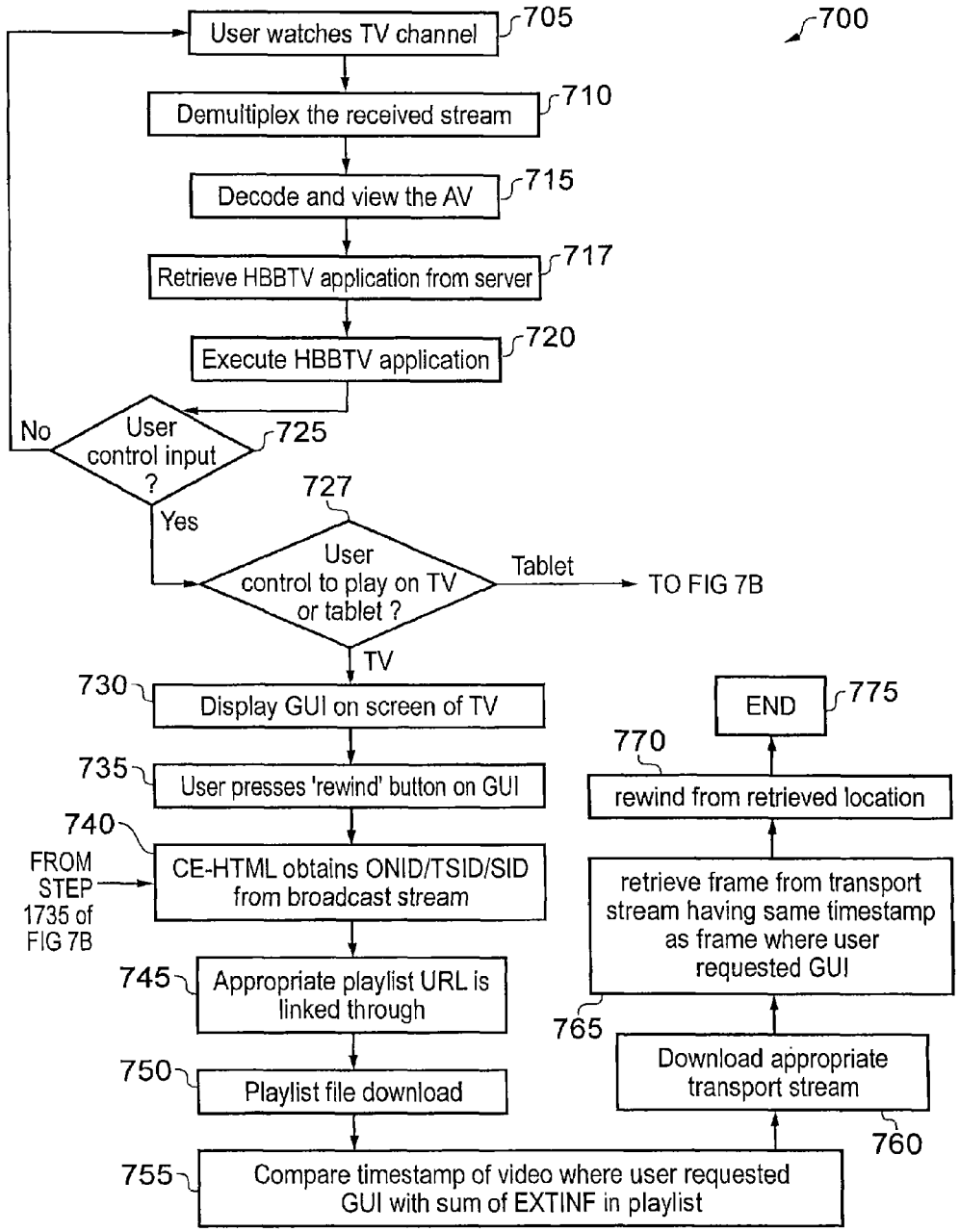
FIG. 7A shows a flow diagram explaining the viewing of live rewind according to embodiments of the present disclosure when the live rewind is viewed on the television.
Figure 7B:
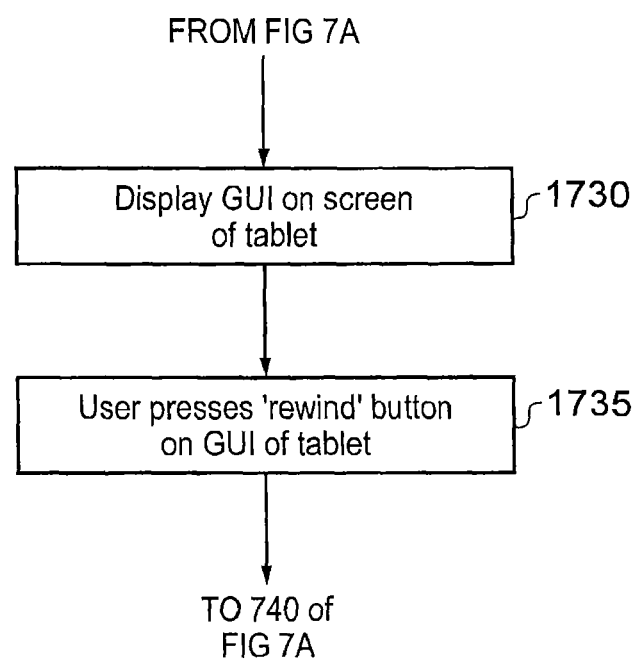
FIG. 7B shows a flow diagram explaining the viewing of live rewind according to embodiments of the present disclosure when the live rewind is viewed on a tablet.

A flow diagram 700 explaining the operation of the system according to embodiments is shown in FIGS. 7A and 7B. A user switches the television 140 on and chooses an appropriate channel in step 705. The television 140 receives the multiplexed stream via the antenna 160. The received stream is demultiplexed in step 710. The demultiplexed stream is decoded and viewed on the television in step 715. Additionally, in step 717, the television 140 retrieves the HBBTV URL from the transport stream and downloads the HBBTV application from the server 120. The HBBTV application is stored in memory 230 within the television 140. The television 140 also executes the HBBTV application at step 720. As the television 140 executes the HBBTV application prior to the user pressing the red button to activate the GUI, the time taken for the television 140 to respond to the user input is significantly reduced.

The decision point at step 725 is then reached. If the user does not wish to launch the interactive GUI, the user does not press the red button and so the "no" path is followed. The user continues to watch the broadcast transport stream. However if the user does press the red button to launch the interactive GUI, the "yes" path is followed. At this point a second decision point at 727 is reached. This decision point determines whether the tablet or the television displays the video played back from the server.

If the television 140 plays back the video from the server, the HBBTV application shows the GUI on the screen of the television 140. This is step 730. As previously mentioned, the content displayed on the television 140 will be the broadcast content.

The user chooses to "rewind" the content in step 735. Therefore, the user selects the appropriate icon on the GUI. After the selection of the appropriate icon is made, the frame is frozen on the screen of the television 140 and the egg-timer or appropriate message is displayed.

The HBBTV application retrieves the video timestamp and the DVB triplet from the frozen video frame. This is step 740. Using the look-up table, the playlist URL corresponding to the retrieved triplet is followed. This is step 745. The playlist stored at the retrieved playlist URL is downloaded. This is step 750.

As the retrieved playlist contains links to many 8 second transport streams, the television must determine which of the stored transport streams includes the frozen frame.

In order to do this, the television compares the retrieved video timestamp with the sum of the 8 second transport stream clips. In other words, if the video timestamp indicates that the frozen frame is, say, 817 seconds from the start of the broadcast, then the appropriate frame will be located within the $103^{rd}$ transport stream within the playlist. In other words, for transport stream clips 8 seconds long, the frame that is 817 seconds from the start of the broadcast will be located approximately 1 second into the $103^{rd}$ transport stream. This is step 755. The television 140 then retrieves, in this case, the $103^{rd}$ transport stream identified in the playlist. This is step 760. After downloading the $103^{rd}$ transport stream, the television identifies the approximate location of the frozen frame using the video timestamp. This approximate location is determined as being the video timestamp in the stored transport stream being closest to the video timestamp retrieved from the frozen image. This is step 765. The television 140 then rewinds from the location. This is step 770. The process for rewinding ends when the user presses the play button in the GUI. This is step 775.

The user then watches the content from the server 120. When the user wishes to return to watching the broadcast content, the user presses the red button or the button on the GUI. The HBBTV application may simply finish and return to displaying the broadcast content. However, as the content is concurrently broadcast, the time taken to return to viewing the broadcast content may result in a discontinuity in viewing of the content.

In order to reduce the effect of the discontinuity, a transition process is followed. Specifically, the memory 230 within the television 140 is, in embodiments, used as a buffer to store some of the video broadcast by the broadcast station 150. The memory 230 may be used to store all the video broadcast by the broadcast station, or may be used to store only certain frames of the video. For example, the memory 230 may be used to store only I-frames. However, when using the memory 230 as a buffer, the video broadcast by the broadcast station 150 will always be buffered by the memory 230 irrespective of whether the content being displayed is actually being provided by the server 120.

The memory 230, in embodiments, stores, and buffers 8, seconds of video. In other words, although the memory 230 could store any length of video, in embodiments, the amount of video stored by the memory 230 is the same as the length as one of the transport stream files. The video stored in memory 230 is then used to reduce the impact of the discontinuity.

In one mechanism of operation of the transition process, when the user wishes to return to viewing broadcast content, the 8 second transport stream file retrieved from the server 120 is played back at twice the normal speed. This means that the 8 second transport stream file is played back in 4 seconds.

The next 8 seconds of broadcast content is then played back from the memory 230 at twice the normal speed. In other words, the next 8 seconds of broadcast content are provided by the memory 230 rather than the server 120 and is played back within 4 seconds. Thus, when viewing of live broadcast content resumes after this transition, the effect of the discontinuity is reduced to zero time lag. In order to reduce the effect of the increased speed of playback and in order to reduce the memory usage, it is possible to only play back I frames during this speeded playback period.

In a second mechanism of operation, if the user has requested that the television 140 rewind the live content, in embodiments, the television 140 will continuously store 8 seconds of buffered content from the broadcast station 150. Therefore, when the user switches back to watching live content, the content will be provided by the buffer in the memory 230 rather than being provided by the antenna 160 directly. In other words, the user will watch video content that is delayed by 8 seconds compared to the content received by the antenna 160. This arrangement removes all discontinuities and requires no speeding up of displayed content.

In other modes of operation, a so-called buffer flush may be employed upon detection of selection signals from the user to allow a swift transition between the content stored in the respective buffers. This operates by repositioning a pointer to the location in memory that should be read.

In the case that the tablet 800 plays back the content, the flow diagram of FIG. 7B is followed. Before the flow diagram of FIG. 7B is described, the interaction of the tablet 800 and the television 140 will be described.

In embodiments, the television 140 which receives both the broadcast channel and the transport stream from the server itself acts as a server to the tablet 800. The television 140 may transmit either the video data from the broadcast channel, the transport stream identified by the playlist or both. It is therefore possible for the broadcast channel to be displayed on both the television 140 and the tablet 800.

So, after connection of the tablet 800 to the television 140, the television 140 receives the broadcast channel. The television 140 then acts as a server from which the tablet 800 receives content. The television 140 sends video data in a unicast fashion to the IP address to which the tablet 800 is connected. Obviously, if more than one tablet is connected to the television 140, video data can be transferred in a unicast or multicast fashion. This allows video data from either the broadcast channel or the transport stream (or both) to be played back on the tablet 800.

Figure 8:
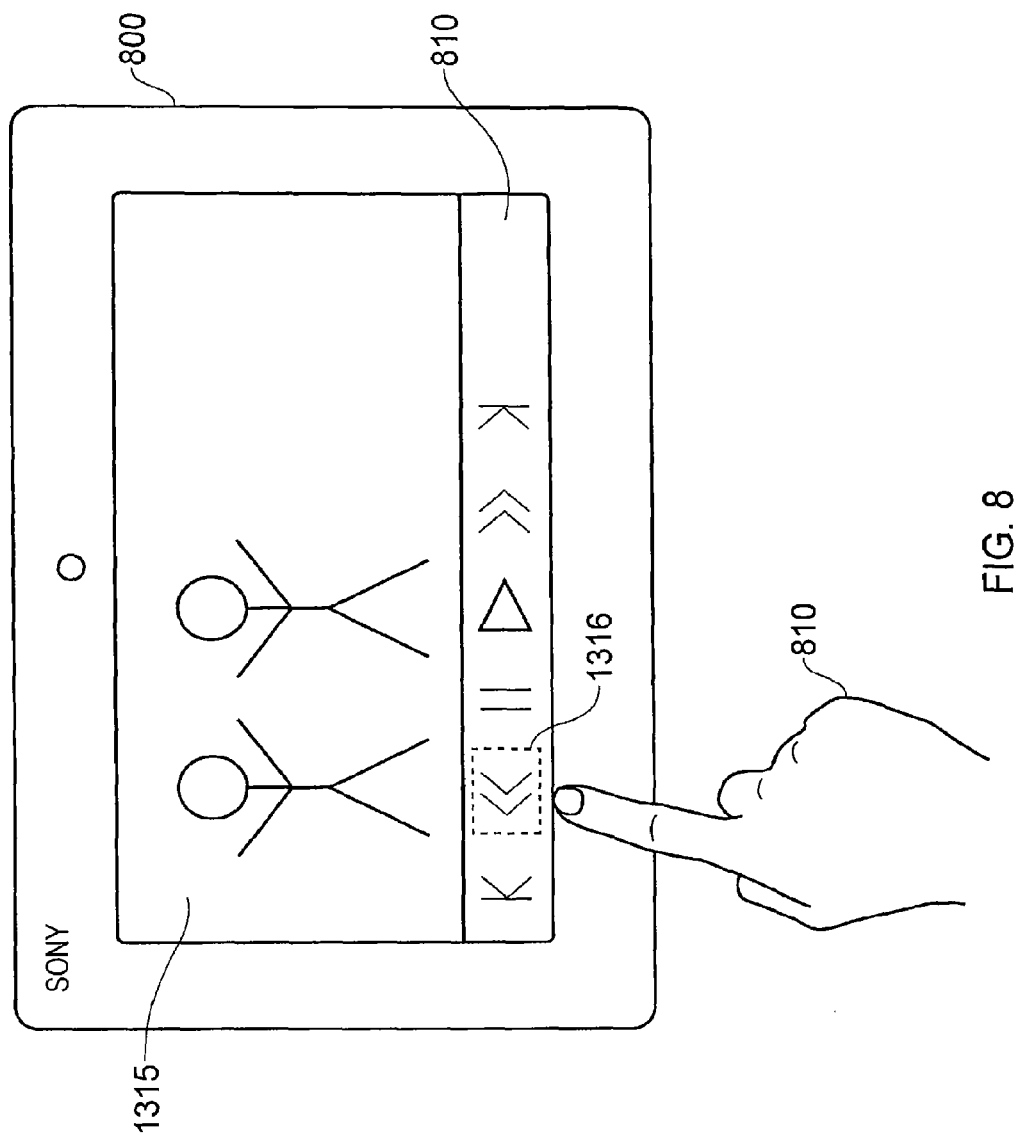
FIG. 8 shows a plan view of a tablet in use to control the video stream.

Returning to FIG. 7B, when the tablet 800 is used to control the video played back from the server, step 1730 is performed. The tablet may obtain the HbbTV application or be capable of storing and executing a separate application for example defining the GUI. The Tablet may an appropriate application for example in HTML from the server. This may be achieved by passing a URL from the HbbTV application in the television 140 to tablet 800. The tablet 800 shows the GUI on the screen as depicted in FIG. 8. As is seen in FIG. 8, the current video 1315 is shown on tablet 800. The GUI has a control bar 810 that appears and allows the user 810 to control the displayed video. In this case, the user 810 presses the rewind button 1316 displayed on the screen of the tablet 800. In other words, the user performs step 1735 of FIG. 7B. It should be noted here that although the GUI displays a control bar 810, in other embodiments, other control mechanisms are envisaged. These are described with reference to FIGS. 9A and 9F and will be described later.

The tablet 800 sends to the television 140 a control signal using, for example, Real Time Streaming Protocol (RTSP). The control signal instructs the television 140 that the user wishes to rewind from the frame displayed on the tablet 800. As the television 140 sends the video to the tablet 800, the television 140 then returns to the flowchart of FIG. 7A from step 740 by retrieving the ONID/TSID/SID from the broadcast stream.

The television 140 retrieves the video from the server and rather than playing back the video transport stream on the television 140, the television transfers the retrieved video on the tablet 800 whilst the television either pauses the broadcast channel allowing the user to continue watching the television 140 later, or continue to display the live broadcast channel concurrently with the user viewing the retrieved video transport stream on the tablet 800.

In other embodiments the server may communicate directly over the IP network with the tablet. The tablet may therefore be seen as a slave to the server rather than as a slave to the television 140.

FIGS. 9A to 9F show different examples of control mechanisms which do not require the control bar 810. These control mechanisms mean that more screen space is provided to display the video.

In FIG. 9A, the mechanism for skipping to the next chapter of video is shown. The user 810 places two fingers 810A and 810B on the touch sensitive screen of the tablet 800. The user 810 then swipes their fingers to the left whilst still touching the screen. The tablet 800 detects both fingers touching the screen and detects the movement to the left. The tablet 800 then issues the command to move the video to the previous chapter. A similar situation is given in FIG. 9F except the user 810 swipes their fingers 810A and 810B to the right to advance the video to the next chapter.

Figure 9E:
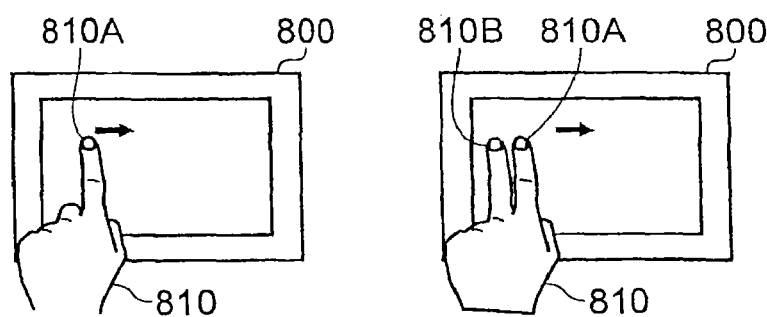
Figure 9E:
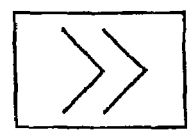
Figure 9F:
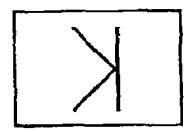

In FIG. 9B, the mechanism for rewinding the video is shown. The user 810 places one finger 810A on the touch sensitive screen of the tablet 800. The user 810 then swipes their finger to the left whilst still touching the screen. The tablet 800 detects that only a single finger touches the screen and detects the movement to the left. The tablet 800 then issues the command to rewind the video. In this case, the speed at which the user swipes their finger determines the speed of rewind. For example, if the user only wishes to rewind the video at ×2 speed, then the swipe should be slow. However, for a ×30 rewind, the swipe should be fast. A similar situation is given in FIG. 9E except the user 810 swipes their finger 810A to the right to fast forward the video.

In FIG. 9C, the mechanism for pausing the video is shown. The user 810 places two fingers 810A and 810B on the touch sensitive screen of the tablet 800. The user 810 then holds their fingers on the screen for a period of time such as 0.3 seconds without movement. The tablet 800 detects both fingers touching the screen and that there is no movement. The tablet 800 then issues the command to pause the video.

In FIG. 9D, the mechanism for playback of the video is shown. The user 810 places one finger 810A on the touch sensitive screen of the tablet 800. The user 810 then holds their finger on the screen for a period of time such as 0.3 seconds without movement. The tablet 800 detects that one finger touches the screen and that there is no movement. The tablet 800 then issues the command to playback the video.

Although the foregoing describes controlling the video in relation to this disclosure, the touch screen commands of FIGS. 9A to 9F could be used on any touch screen device to control playback of any video on any video playback device. For example, the gestures given in FIGS. 9A to 9F could be used to control a DVD player, a Blu-Ray player, a video streaming device or any kind of device where video and/or audio playback needs to be controlled.

Although the foregoing embodiments, a broadcast channel has been described. However, in some video distribution environments, video data or television signals can be distributed over the internet or networks operating internet protocol technologies. These are sometimes referred to as IPTV or OTT (Over the Top) services. In IPTV, a managed network with a guaranteed quality of service may be used. With OTT, IPTV video data is carried over the internet and is available through, for example, the xDSL (Digitial Subscriber Line) subscription of Long Term Evolution (LTE) subscription of the user.

In IP environments, video may be distributed in a unicast fashion. In this type of system, video is distributed in a point-to-point manner from a server to a target device. The video is passed to the target device using a receiver such as a modem, router or home gateway device.

In other embodiments, video may be distributed using multicast protocols. Groups of target devices may be pre-defined or actively defined by making requests to join multicast groups. This may be in exchange for payment. Video data is then distributed using multicast identifiers or addresses contained therein with header information or the like. The target devices belonging to the multicast group then identifies and interpret the video data packets received via the network. Other devices will ignore the packets. The skilled person will appreciate that multicast transmission will save bandwidth when multiple devices are receiving the same video content items. The disclosure is applicable to multicast channels in a similar way to broadcast channels. Therefore, although broadcast channels are noted above, the disclosure is relevant to multicast channels or any type of distribution channels. The stored transport stream which the playlist identifies may be sent to the target devices using unicast protocols.

Although the foregoing has been described with reference to a tablet 800, any kind of device with a screen is envisaged. For example, a cell phone, laptop computer or the like could be used instead of or as well as the tablet 800.

Although the foregoing has been explained with reference to the transport streams on the server being produced from the captured content being broadcast, the disclosure is not so limited. For example, the transport streams on the server may include the broadcast content being captured from a different camera angle or level of zoom. Or, the transport stream on the server may include content related to the broadcast content. For example, if the broadcast content is a movie, the content on the server referenced by the playlist may be director's commentary.

Although the foregoing has been explained with the playlist complying with the HTTP Live Streaming Protocol, the disclosure is not so limited. Other suitable protocols include MPEG DASH or Microsoft Smooth Streaming or the like.

Although the foregoing has been described with reference to the video timestamp being used as the unique identifier, the disclosure is not so limited. Any unique identifier that enables the location of the frame to be established within the playlist may be used. For example, if the EIT is part of the broadcast transport stream, the elapsed time from the start time of the EIT may be used. Indeed, if other metadata such as the unique time code (UTC) in the TDT/TOT (Time and Data Table/Time Offset Table) is provided in the other data, this may be used.

Although the foregoing has been explained with reference to the user rewinding the broadcast content, the disclosure is not so limited. The user may pause the broadcast content, may fast forward the content (by skipping frames), may play back the content in slow motion or indeed perform any review of the content.

Although the foregoing has been explained with reference to the transport stream provided by the server 120 being displayed instead of the transport stream provided by the broadcast station 150, the disclosure is not so limited. The transport stream provided by the server may be provided in addition to the broadcast transport stream. For example, the transport stream provided by the server 120 may be displayed in a picture-in-picture arrangement with the content provided by the broadcast station 150. This allows the user to view the obtained transport stream concurrently with the broadcast transport stream.

Although the foregoing has been explained with HBBTV being used for the GUI, the disclosure is not so limited and any kind of appropriate programming language such as Adobe Flash or MHEG may be used instead.

Although the foregoing explains the use of a look-up table whereby the DVB triplet is stored in association with the playlist URL, the disclosure is no way limited. Indeed, if the broadcaster wishes to only associate one playlist with one channel, the playlist URL may be included in the broadcast transport stream. In this case, no look-up table is required.

In some embodiments the HBBTV application may restrict fast-forwarding of the content. This allows files to be uploaded to the server 120 in advance, but restricts fast-forwarding so that a viewer cannot watch content from the server 120 that has yet to be broadcast.

The invention claimed is:

1. A method of controlling video and/or audio stream playback, comprising:
    detecting a control input to a touch sensitive screen; and
    responsive to said detecting the control input to the touch sensitive screen, transitioning from outputting to a first display a first stream of video and/or audio data provided by a first source to outputting to a second display a second stream of video and/or audio data provided by a second source,
    wherein content of the first stream of video and/or audio data is the same as content of the second stream of video and/or audio data, and
    wherein the outputting to the second display comprises, with respect to the outputting to the first display, a stream retrieve delay and applying a user determined delay which is controlled by the control input to the touch sensitive screen.

2. The method of claim 1,
    wherein the first source is different from the second source, and
    wherein, when output of the first stream of video and/or audio data is transitioned to output of the second stream of video and/or audio data, the first stream of video and/or audio data continues to be decoded.

3. A non-transitory storage medium containing computer readable instructions which, when loaded onto a computer configure the computer to perform a method comprising:
    detecting a control input to a touch sensitive screen; and
    responsive to said detecting the control input to the touch sensitive screen, transitioning from outputting to a first display a first stream of video and/or audio data provided by a first source to outputting to a second display a second stream of video and/or audio data provided by a second source,
    wherein content of the first stream of video and/or audio data is the same as content of the second stream of video and/or audio data, and
    wherein the outputting to the second display comprises, with respect to the outputting to the first display, a stream retrieve delay and applying a user determined delay which is controlled by the control input to the touch sensitive screen.

4. The non-transitory storage medium of claim 3,
    wherein the first source is different from the second source, and
    wherein, when output of the first stream of video and/or audio data is transitioned to output of the second stream of video and/or audio data, the first stream of video and/or audio data continues to be decoded.

5. An electronic device for replaying video and/or audio streams comprising:
    circuitry configured to detect a control input to a touch sensitive screen; and
    a processor configured to
    instruct decoding of a second stream of video and/or audio data, and
    cause, responsive to detection the control input to the touch sensitive screen, transition from outputting to a first display a first stream of video and/or audio data provided by a first source to outputting to a second display the second stream of video and/or audio data provided by a second source,
    wherein content of the first stream of video and/or audio data is the same as content of the second stream of video and/or audio data, and
    wherein the outputting to the second display comprises, with respect to the outputting to the first display, a stream retrieve delay and applying a user determined delay which is controlled by the control input to the touch sensitive screen.

6. The electronic device of claim 5, wherein the processor is configured to decode the first stream of video and/or audio data.

7. The electronic device of claim 6, wherein, when output of the first stream of video and/or audio data is transitioned to output of the second stream of video and/or audio data, the first stream of video and/or audio data continues to be decoded.

8. The electronic device of claim 7, wherein the processor is configured to cause the transition from output of the second stream of video and/or audio data based on detection of the control input to the touch sensitive screen to output of the first stream of video and/or audio data, which has continued to be decoded.

9. The electronic device of claim 8, wherein the transition from output of the second stream of video and/or audio data to output of the first stream of video and/or audio data includes outputting the second stream of video and/or audio data at an increased playback speed prior to outputting the first stream of video and/or audio data.

10. The electronic device of claim 6, further comprising an interface configured to receive the first stream of video and/or audio data from a local server, which is the first source.

11. The electronic device of claim 10, wherein the local server is a television, and the first stream of video and/or audio data represents a live broadcast channel.

12. The electronic device of claim 6, further comprising an interface configured to receive the second stream of video and/or audio data from a remote server via a network, which is the second source.

13. The electronic device of claim 6, further comprising an interface configured to receive the first stream of video and/or audio data from a local server, which is the first source, and to receive the second stream of video and/or audio data from a remote server via a network, which is the second source.

14. The electronic device of claim 13, wherein the local server is a television, and the first stream of video and/or audio data represents a live broadcast channel.

15. The electronic device of claim 5, wherein the processor is configured to decode the second stream of video and/or audio data from a plurality of clips comprising a playlist.

16. The electronic device of claim 5, wherein the electronic device is configured to obtain a pointer to the second stream of video and/or audio data stored in association with the first stream of video and/or audio data.

17. The electronic device of claim 5, wherein the second stream of video and/or audio data comprises a plurality of clips, and the control input defines one or more clips of the second stream of video and/or audio data.

18. The electronic device of claim 5, wherein the touch sensitive screen is one of the first display and the second display.

* * * * *